United States Patent [19]

Casper, Jr.

[11] 4,345,187

[45] Aug. 17, 1982

[54] HIGH RESOLUTION, HIGH DENSITY CRT MONITOR

[75] Inventor: Clarence Casper, Jr., Windsor, Conn.

[73] Assignee: Moniterm Corporation, Wayzata, Minn.

[21] Appl. No.: 261,503

[22] Filed: May 7, 1981

Related U.S. Application Data

[63] Continuation of Ser. No. 154,504, May 29, 1980, abandoned.

[51] Int. Cl.³ .................. H01J 29/70; H01J 29/76
[52] U.S. Cl. .................................. 315/408; 315/384
[58] Field of Search .................... 315/408, 399, 384

[56] References Cited

U.S. PATENT DOCUMENTS 4,096,415 12/1980 Haferl .................................. 315/408

Primary Examiner—Theodore M. Blum
Attorney, Agent, or Firm—Kinney, Lange, Braddock, Westman and Fairbairn

[57] ABSTRACT

A high performance cathode ray tube (CRT) display monitor is capable of operating at a rate of 50,000 horizontal scans per second. The monitor receives vertical sync, horizontal blank, and video input signals. The vertical sync signal is supplied to an integrated circuit vertical deflection system which produces vertical deflection signals (for the vertical yoke) and vertical blank signals. The horizontal blank signal is supplied to an integrated circuit phase lock loop which includes a phase comparator and a voltage controlled oscillator (VCO). The output of the VCO is amplified to produce horizontal deflection signal pulses (for the horizontal yoke). The horizontal retrace signal pulses are supplied to a comparator input of the phase lock loop, and are compared with the horizontal blank signal. The output of the phase comparator is filtered by a low pass filter and supplied to the input of the VCO, thereby controlling the VCO to lock the horizontal deflection signal pulse frequency to the frequency of the horizontal blank input signal. The horizontal retrace signal pulses are also coupled through a transformer to the base of a transistor where they are summed with the vertical blank signals to control switching of the transistor and thus produce blanking signals for the CRT.

24 Claims, 3 Drawing Figures

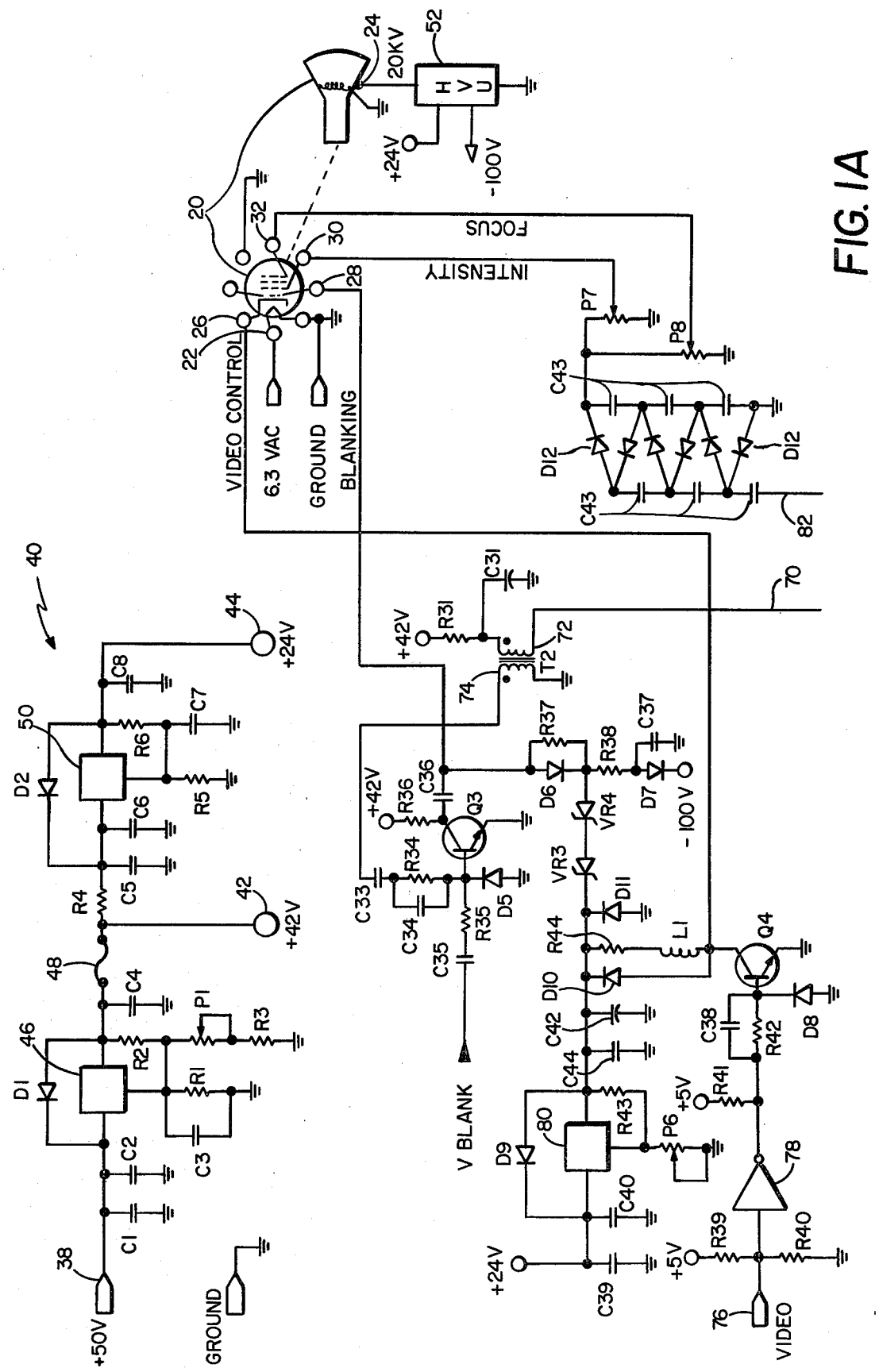
FIG. IA

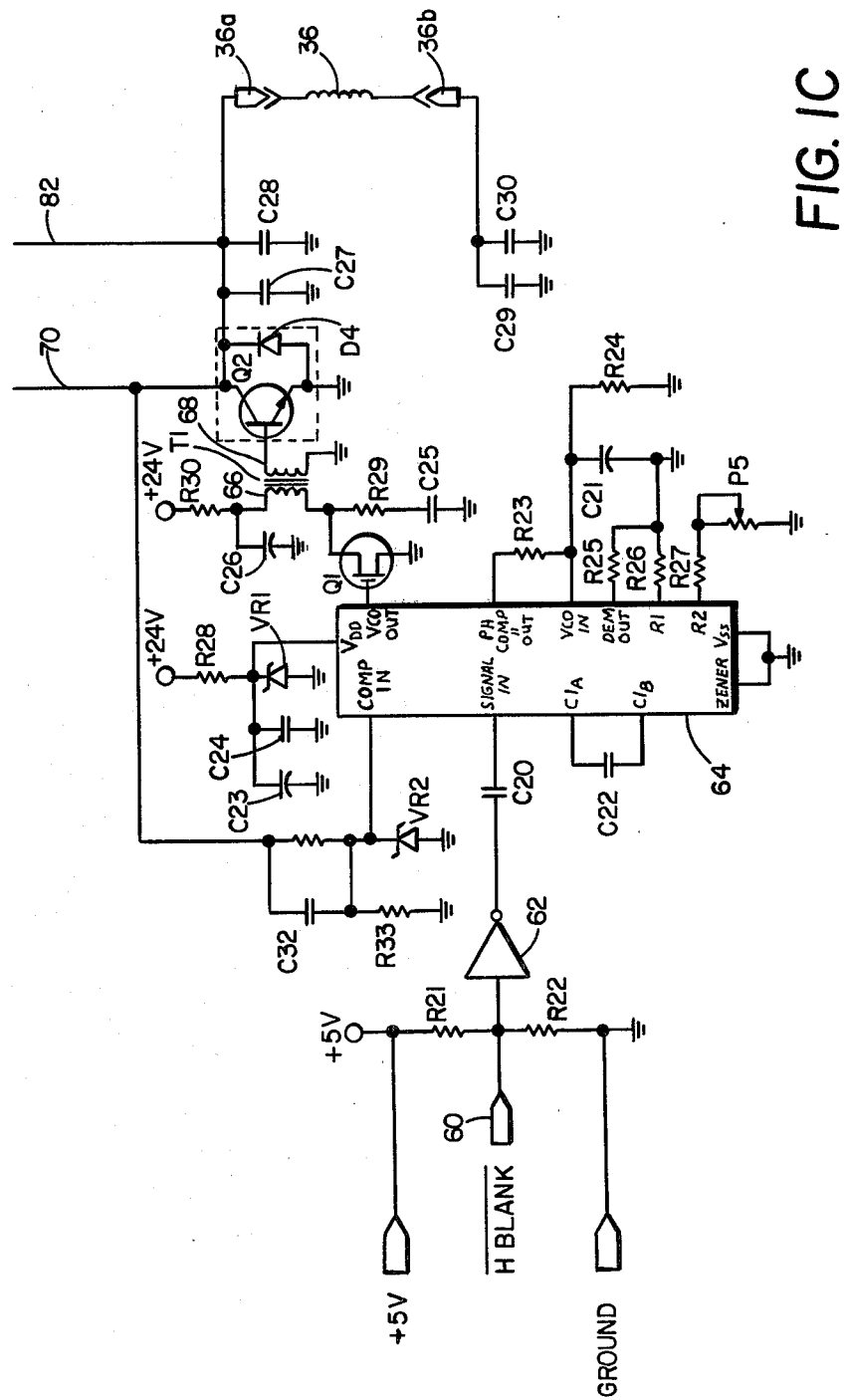
FIG. IC

HIGH RESOLUTION, HIGH DENSITY CRT MONITOR

This is a continuation of application Ser. No. 154,504, filed May 29, 1980 now abandoned.

BACKGROUND OF THE INVENTION

1. Field of the Invention

The present invention relates to cathode ray tube (CRT) displays. In particular, the present invention is drive circuitry for driving a CRT at very high speeds.

2. Description of the Prior Art

Cathode ray tube (CRT) display monitors have found increasing use in various fields of information processing. Because CRT monitors can display full pages of readable information, there is an increasing demand for high performance CRT monitors for word processing, graphics, electronic document storage and retrieval, and other electronic information processing applications.

One important application of high performance CRT monitors is in word processing equipment. There is an increasing trend toward word processing equipment in which an entire page is displayed. This permits the operator to see an image of what will be printed, before it is printed. From a human engineering standpoint, a page image with black characters on a white background provides the operator with the best page image display possible, since it most closely approximates the appearance of the finished product.

Another important application of high resolution, high density CRT monitors is in computer based systems which provide facsimile (FAX) type displays. In this application the actual image of the page of paper, including photos, signatures, drawings, diagrams and handwritten messages, is displayed. The source of data may be a "FAX" machine, a video disk (or other laser based encoding-decoding equipment), a standard computer data base, or a high resolution camera. Operation of this equipment, however, is predicated upon the availability of high resolution, high density CRT monitors.

Another important application for high resolution, high density CRT monitors is in photocomposing systems. The very nature of the photocomposing task virtually demands a page image display as an integral part of the photocomposing system.

High resolution, high density CRT monitors have been developed in recent years which operate at horizontal scan rates which are much higher than the industry standard 15.75 KHz. These monitors include the Motorola M4408, the CPT Corporation HRD15 and the Video Monitors Inc. M15A60.

The Motorola M4408 is an interlaced unit having a horizontal scan rate of 34 kHz and a video bandwidth of 50 MHz. Since it is an interlaced unit, the M4408 requires a slow response yellow-green T19 phosphor, which limits its resolution and contrast. In addition, the M4408 is relatively bulky, complex and expensive.

The CPT Corporation HRD15 has a horizontal scan rate of 50 kHz and a video bandwidth of 100 MHz. While providing high performance, the CPT HRD15 is complex and expensive.

The Video Monitor M15A60 has a horizontal scan rate of 50 kHz and a video bandwidth of 85 MHz. While providing high performance, it is also relatively complex and expensive.

There is a continuing need for a high performance CRT monitor capable of operating at high scan rate with high resolution, while being less complex and expensive than the prior art high resolution, high density CRT monitors.

SUMMARY OF THE INVENTION

The present invention is a high performance CRT monitor which is simple and uses far fewer components than the prior art high performance CRT monitors. The CRT monitor of the present invention includes a vertical deflection circuit, which receives a vertical sync input signal and produces vertical deflection and vertical blank signals.

A horizontal blank signal is supplied to one input of a phase locked loop which includes a phase comparator and a voltage controlled oscillator (VCO). The horizontal blank signal is supplied to one input of the phase comparator, and a horizontal retrace signal is supplied to the other input of the phase comparator. The output of the phase comparator is a function of the comparison of the horizontal blank and horizontal retrace signals, and is filtered and supplied as a control voltage input to the VCO. The output of the VCO is amplified and supplied to the horizontal yoke as the horizontal drive signal. The horizontal retrace signal is also fed through a transformer and summed with the vertical blanking signal to produce the blanking signal applied to the CRT.

BRIEF DESCRIPTION OF THE DRAWINGS

FIGS. 1A, 1B and 1C are a schematic diagram of a preferred embodiment of the CRT monitor of the present invention.

DETAILED DESCRIPTION OF THE PREFERRED EMBODIMENTS

Figure 1B:
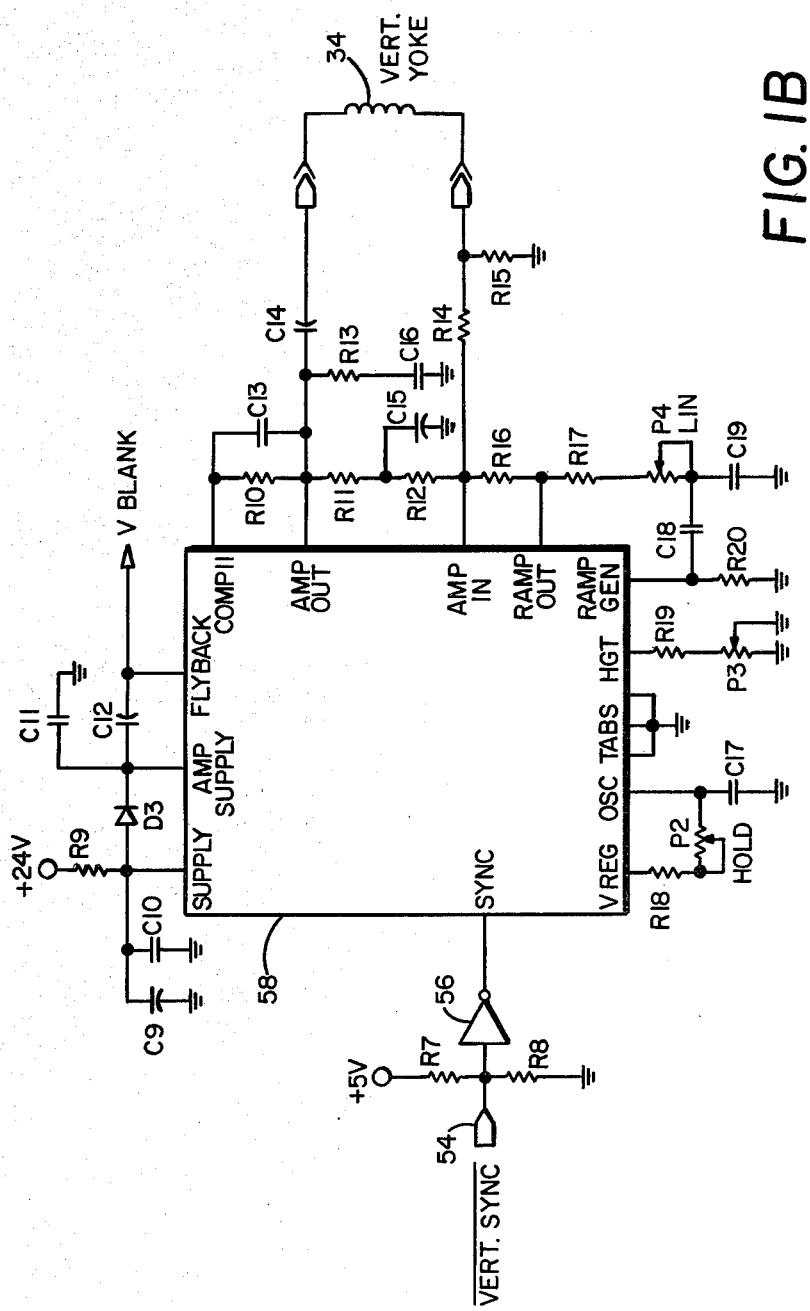

In FIG. 1A, cathode ray tube 20 is shown. A 6.3 V AC signal is applied to cathode 22 and a 15-kV voltage is applied to anode 24 of CRT 20. A VIDEO CONTROL signal is applied to grid 26, a BLANKING signal is applied to grid 28, an INTENSITY control signal is applied to grid 30, and a FOCUS control signal is applied to grid 32.

Deflection signals provide scanning of the electron beam in the CRT and are applied to vertical yoke 34 shown in FIG. 1B and horizontal yoke 36 shown in FIG. 1C.

Input signals to the monitor drive circuitry are the 6.3 volt AC or DC signal, +5 volt DC and +50 volt DC input voltages, a VIDEO signal, a $\overline{\text{HBLANK}}$ (horizontal blank) signal, and a $\overline{\text{VERTSYNC}}$ (vertical sync) signal.

The +50 volt input voltage is supplied to input terminal 38 of power supply circuit 40. As shown in FIG. 1A, power supply circuit 40 includes a first regulator circuit which supplies a regulated +42 V voltage at terminal 42, and a second regulator circuit which supplies a regulated +24 V voltage at terminal 44. The first regulator circuit is connected to input terminal 38, and includes voltage regulator 46, fuse 48, capacitors C1–C4, resistors R1–R3, potentiometer P1 and diode D1. The second regulator circuit is connected to terminal 42, and includes voltage regulator 50, capacitors C5–C8, resistors R4–R6, and diode D2.

The +24 V voltage is supplied to high voltage unit 52, which produces a −100 volt voltage and a 15 KV voltage which is applied to anode 24 of CRT 20.

FIG. 1B shows the vertical deflection circuitry of the CRT monitor. The $\overline{\text{VERTSYNC}}$ signal, which is a TTL compatible signal, is received at terminal 54 by an input circuit formed by resistors R7 and R8 and buffer 56. In the preferred embodiment of the invention, buffer 56 is a high speed Schottky TTL Schmitt trigger which receives the $\overline{\text{VERTSYNC}}$ signal, trims the signal, and supplies it to the SYNC input of vertical deflection circuit 58. In the preferred embodiment of the invention shown in FIG. 1B, vertical deflection circuit 58 is a TDA 1170 integrated circuit TV vertical deflection system.

Deflection circuit 58, together with capacitors C9–C19, resistors R9–R20, potentiometers P2–P4, and diode D3 provide the vertical deflection drive signal to vertical yoke 34 and the vertical blanking signal (VBLANK).

The horizontal deflection is provided by the circuit shown in FIG. 1C. The horizontal blanking signal ($\overline{\text{HBLANK}}$), which signal is a 50 kHz TTL compatible signal, is supplied at input terminal 60 to an input circuit including resistors R21 and R22, buffer 62, and capacitor C20. Buffer 62 is a high-speed Schottky TTL Schmitt trigger.

The $\overline{\text{HBLANK}}$ signal is supplied from the input circuit to the SIGNAL IN input of an integrated circuit phase locked loop 64. In the preferred embodiments of the present invention, phase locked loop 64 is a CMOS micropower phase locked loop such as the 4046 manufactured by a number of companies including RCA and Fairchild. Phase locked loop 64 includes a phase comparator and a voltage control oscillator (VCO). The phase comparator compares the $\overline{\text{HBLANK}}$ signal supplied at the SIGNAL IN input with a comparison signal supplied at the COMP IN input. The output of the phase comparator is supplied from the PH COMP II OUT output, through a low pass filter circuit including resistors R23 and R24 and capacitor C21 to the VCO IN input. Capacitor C22 is connected to the C1$_A$ and C1$_B$ terminals of phase locked loop 64. The demodulator output of phase locked loop 64 is connected through resistor R24 to ground, and the R1 terminal is connected through resistor R26 to ground. Terminal R2 of phase locked loop 64 is connected through resistor R27 and potentiometer P5 to ground. The V$_{SS}$ and ZENER terminals are connected directly to ground. A +12 V reference voltage is supplied to the V$_{DD}$ input of phase locked loop 64 by a circuit including resistor R28, capacitors C23 and C24, and Zener diode VR1, which is preferably a 12 volt Zener diode.

The output of phase locked loop 64 is supplied at the VCO OUT output, and is a square wave output signal having a frequency of 50 kHz (i.e. the frequency of the $\overline{\text{HBLANK}}$ signal). The VCO output signal is supplied to a first amplifying circuit which includes VMOS transistor Q1, capacitors C25 and C26, VMOS protection resistor R29 and current limiting resistor R30, and transformer T1. When the VCO output signal goes high, it turns on VMOS transistor Q1, which shunts VMOS protection resistor R29 and capacitor C25. The turning on of transistor Q1 causes current to be drawn from the +24 V supply, through current limiting resistor R30 and primary winding 66 of transformer T1, and then through the source-drain current path of transistor Q1. VMOS transistor Q1 is a voltage controllable nonlinear resistance, and therefore the drive signal induced in secondary winding 68 is a 50% duty pulse having a linear leading edge. This induces a signal in secondary winding 68 of transformer T1. In a preferred embodiment, primary winding 66 has fifty turns, while secondary winding 68 has ten turns. This causes a step down in voltage and a step up in current in secondary winding 68.

Secondary winding 68 of transformer T1 has one terminal connected to ground, and its other terminal connected to a second amplifying circuit which produces the horizontal deflection signal. The second amplifying circuit includes a high voltage, high gain monolithic Darlington amplifier transistor Q2, second transformer T2, capacitors C27–C31, current limiting resistor R31, and diode D4. As shown in FIGS. 1A and 1C, the base of transistor Q2 is connected to secondary winding 68, the emitter of transistor Q2 is connected to ground, and the collector of transistor Q1 is connected through line 70, primary winding 72 of transformer T2, and current limiting resistor R31 to the +42 volt supply. When transistor Q2 turns on, current flows through resistor R31, primary winding 72, and through line 70 to the collector-emitter current path of Q2. This causes a voltage spike (the horizontal deflection signal) to be generated which is applied to horizontal yoke 36. The leading edge of the voltage spike is linear, thereby creating a linear horizontal scan.

In FIG. 1C, protective diode D4 and capacitors C27 and C28 are connected between the collector and emitter of transistor Q1. Transistor Q2 and diode D4 are preferably located in the same integrated circuit, as indicated by the dashed outline. Horizontal yoke 36 has one terminal 36a connected to the collector of Q2, and its other terminal 36b connected through yoke coupling capacitors C29 and C30 to ground.

The collector of transistor Q2 is also connected by a circuit including resistors R32 and R33 and capacitor C32 to the COMP IN input of phase locked loop 64. Zener diode VR2, which is preferably a 10 volt Zener diode, is connected between the COMP IN input and ground, and limits the signal supplied to the COMP IN input to a maximum voltage of 10 volts. This protects the CMOS circuitry of phase locked loop 64 against high voltages induced at the collector of transistor Q2.

It can be seen, therefore, that the VCO output signal from phase locked loop 64 is converted to the horizontal deflection signal, and is then fed back to the COMP IN input of phase locked loop 64. The horizontal deflection signal, therefore, is locked onto the $\overline{\text{HBLANK}}$ signal, which is supplied at the SIGNAL IN input. In the preferred embodiment, in which the $\overline{\text{HBLANK}}$ signal has a frequency of 50 kHz, the horizontal deflection signal and the collector of transistor Q2 will be locked to a frequency of 50 kHz, and the leading edge of horizontal retrace pulse at the collector of Q2 will be phase locked to the leading edge of the $\overline{\text{HBLANK}}$ signal. The locking of phase of the leading edge of blanking pulse to the leading edges of retrace pulse produced at transistor Q2 negates changes in storage time of transistor Q2 or turn-off time variations over time and operating temperature.

The horizontal retrace signal present in primary winding 72 of transformer T2, induces a horizontal blanking signal in secondary winding 74 of transformer T2. This signal is fed through capacitors C33 and C34 and resistor R34 to the base of transistor Q3. The horizontal blanking signal at the base of Q3 is summed with the vertical blanking signal of VBLANK which is supplied through capacitor C35 and resistor R35 to the base of Q3.

The summed horizontal and vertical blanking signals at the base of transistor Q3 cause transistor Q3 to produce the BLANKING signal supplied to grid terminal 28 of CRT 20. The emitter of Q3 is connected to ground, while the collector is connected through resistor R36 to the +42 volt supply. Protective diode D5 is connected between the base and emitter of Q3. The collector of Q3 is also connected through capacitor C36 to terminal 28. Terminal 28 is also connected to a −100 V supply voltage from the high voltage unit 52 through a circuit including diodes D6 and D7, resistors R37 and R38, and capacitor C37. As a result of the VBLANK signal and the horizontal blanking signal supplied through transformer T2, Q3 turns on each time either a horizontal blanking or a vertical blanking signal is produced. This causes an additional −42 V to be applied to grid terminal 28 of CRT 20 causing the display to be blanked independent of state of video drive signal. Diodes D7 and C37 serve to hold grid terminal 28 negative and when power is removed from circuits keeping CRT 20 in cutoff and preventing CRT phosphor from burning due to an undeflected beam.

FIG. 1A also shows a video circuit, which supplies the VIDEO CONTROL signal to video grid terminal 26 of CRT 20. The embodiment shown in FIG. 1A is a black-and-white video circuit, with no gray scale. It should be understood, however, that the present invention is equally applicable to CRT monitors in which the video circuit provides gray scale.

The VIDEO input signal, which is a TTL compatible signal, is received at input terminal 76 of an input circuit including resistors R39 and R40, buffer 78, resistors R41 and R42, capacitor C38, and diode D8. The input circuit supplies the VIDEO input signal to the base of transistor Q4. The emitter of Q4 is connected to ground, while the collector of Q4 is connected to the video grid terminal 26 of CRT 20.

The voltage at the collector of Q4, when Q4 is turned off, is established by a circuit including capacitors C39–C42, resistors R43 and R44, diodes D9, D10 and D11, potentiometer P6, inductor L1, and voltage regulator 80. A pair of Zener diodes VR3 and VR4 are connected between the junction of resistors R37 and R38 and the output of voltage regulator 80. Potentiometer P6 adjusts the regulated output voltage from voltage regulator 80, and thereby adjusts the video contrast by varying video drive voltage and negative cutoff voltage via Zener diodes VR3 and VR4. Additionally the operating point or "ON" point of the display is ground or "ZERO" volts when Q4 is on. The manner of adjusting contrast is an improvement over standard techniques in that the adjustment potentiometer P6 does not carry video signals and no degradation of video results especially when remote adjustment is desired.

The monitor of the present invention also includes intensity and focus control potentiometers P7 and P8, which are connected to intensity control grid 30 and focus control grid 32, respectively. Voltage is supplied to potentiometers P7 and P8 for the INTENSITY and FOCUS control signals through a voltage multiplier circuit which is connected to the collector of transistor Q2 through line 82, and which includes diodes D12 and capacitors C43.

Table I is a list of components used in a preferred embodiment of the present invention.

TABLE 1

| C1 | 27 μf |
| --- | --- |
| C2 | 0.1 μf |
| C3 | 0.1 μf |
| C4 | 0.1 μf |
| C5 | 0.1 μf |
| C6 | 250 μf |
| C7 | 0.1 μf |
| C8 | 0.1 μf |
| C9 | 470 μf |
| C10 | 0.1 μf |
| C11 | 0.1 μf |
| C12 | 470 μf |
| C13 | 47pf |
| C14 | 470 μf |
| C15 | 22 μf |
| C16 | 0.1 μf |
| C17 | 0.1 μf |
| C18 | 0.1 μf |
| C19 | 0.1 μf |
| C20 | 0.01 μf |
| C21 | 220pf |
| C33 | 1000pf |
| C23 | 10 μf |
| C24 | 0.1 μf |
| C25 | 0.001 μf |
| C26 | 18 μf |
| C27 | 0.0068 μf |
| C28 | 0.015 μf |
| C29 | 2.2 μf |
| C30 | 2.2 μf |
| C31 | 18 μf |
| C32 | 47pf |
| C33 | 0.01 μf |
| C34 | 220pf |
| C35 | 1 μf |
| C36 | 0.01 μf |
| C37 | 1f |
| C38 | 220pf |
| C39 | 4.7 μf |
| C40 | 0.1 μf |
| C41 | 0.1 μf |
| C42 | 4.7 μf |
| C43 | 0.1 μf (each) |
| R1 | 4.7K to 10K |
| R2 | 243 ohm |
| R3 | 698K ohm |
| R4 | 3 ohm |
| R5 | 4.53K |
| R6 | 243 ohm |
| R7 | 220 ohm |
| R8 | 330 ohm |
| R9 | 1 ohm |
| R10 | 220K |
| R11 | 20K |
| R12 | 20K |
| R14 | 5.62K |
| R15 | 1 ohm |
| R16 | 47.5K |
| R17 | 10K |
| R18 | 150K |
| R19 | 100K |
| R20 | 226K |
| R21 | 220 ohm |
| R22 | 330 ohm |
| R23 | 4.7K |
| R24 | 220K |
| R25 | 47K |
| R26 | 499K |
| R27 | 41.2K |
|  | 242.2K |
| R28 | 1K |
| R29 | 1K |
| R30 | 560 ohm |
| R31 | 1 ohm |
| R32 | 47K |
| R33 | 10K |
| R34 | 10K |
| R35 | 10K |
| R36 | 10K |
| R37 | 1M |
| R38 | 2K |
| R39 | 220 ohm |
| R40 | 330 ohm |

TABLE 1-continued

| | |
|---|---|
| R41 | 220 ohm |
| R42 | 330 ohm |
| R43 | 243 ohm |
| R44 | 220 ohm |
| Potentiometer P1 | 2K |
| P2 | 100K |
| P3 | 100K |
| P4 | 50K |
| P5 | 10K |
| P6 | 5K |
| P7 | 2.5M |
| P8 | 2.5M |
| Transistor Q1 | VMP2 |
| Q2 | MJ1005 |
| Q3 | 2N3725 |
| Q4 | 2N3725 |
| Diode D1 | 1N4004 |
| D2 | 1N4004 |
| D3 | 1N4004 |
| D4 | MJ10005 |
| D5 | 1N4148 |
| D6 | 1N4004 |
| D7 | 1N4004 |
| D8 | 1N4148 |
| D9 | 1N4004 |
| D10 | 1N4148 |
| D11 | 1N4004 |
| D12 | 1N4007 (all) |
| Zener Diode VR1 | 12V break down |
| VR2 | 10V |
| VR3 | 47V |
| VR4 | 12V |
| Transformer T1 | |
| primary winding | 50 Turns |
| secondary winding | 10 Turns |
| Transformer T2 | |
| primary winding | 200 Turns |
| secondary winding | 5 Turns |
| Inductor L1 | 10 µH |
| Voltage Regulator 46 | LM317HV |
| Voltage Regulator 50 | LM317HV |
| Voltage Regulator 80 | LM317HV |
| Cathode Ray Tube | 15 inch diagonal |
| | 110° deflection |
| | P110 Phosphor |
| Buffer 56 | 74LS14 |
| Buffer 62 | 74LS14 |
| Buffer 78 | 74SO4 |
| Vertical Deflection | |
| System 58 | TDA1170 |
| Phase Locked Loop 64 | 4046 Phase Locked Loop |
| Fuse 48 | 2 Amp |
| High Voltage Unit 52 | Erie 25BPS150 |

The preferred embodiment of the present invention using the components of Table I is a high performance CRT monitor which is very compact, lightweight and simple in construction. In the preferred embodiment shown in FIGS. 1A–1C all of the circuitry is preferably mounted on a single circuit board, and the entire monitor occupies only about 0.8 cubic feet volume. As a result, it can be fit into a small cabinet, yet is easily serviced since all of the circuitry is on a single circuit board.

The high performance CRT monitor of the present invention, as described in FIGS. 1A–1C and using the components of Table I, produces a horizontal scanning rate of between 49.5 to 50.5 kHz with a pulse width of 1 to 3 µs. The vertical scanning rate is 60 Hz (refresh rate) with a pulse width of 170–250 µs. The video response has a rise/fall pulse time of less than 4 ns with a nominal bandwidth of 100MHz. Horizontal synchronization is 20 to 20.5 µs, vertical synchronization is 15.8 to 21.3 ms, horizontal retrace is 5 µs, and vertical retrace is 666 µs.

The monitor of the present invention, therefore, provides a data matrix of 800×720 individual points (pixels) which allows a very high density of information to be displayed. Using a 5×7 dot matrix per character, eighty-eight lines of data with one hundred characters per line can be displayed. If a 7×9 matrix is used, seventy-two lines with eighty characters to the line are produced. The bandwidth of the video amplifier used in the monitor of the present invention provides much better resolution of each pixel than common CRT monitors.

Because the horizontal scan rate of the monitor is 50 kHz, which is over three times the common 15.75 kHz TV rate, the entire eight hundred line display is refreshed at 60 Hz. This refresh rate allows faster, more precise, lower energy phosphors to be used, which eliminate the "blooming" of the slower, higher energy phosphors. This also eliminates the "shadowing" effect of the slower phosphors which persists after the data has erased. With the 60 Hz refresh of the present invention, system designers utilizing the monitor can avoid troublesome designs required for refreshing alternate raster lines on alternate passes down the screen, and the troublesome timing problems associated with this interlacing technique.

The power requirements of the CRT monitor of the present invention are low. Only about 35 watts input power are required. As a result, heat generation is far less than other high performance CRT monitors.

The monitor exhibits very low linear distortion-less than three percent. Sharp corner focus is exhibited.

Although the specific preferred embodiment of the present invention discussed above operates at a nominal scan rate of 50 kHz, the present invention is applicable to higher scan rates as well. Similarly, although the specific cathode ray tube described as a fifteen inch diagonal, larger cathode ray tubes also may be used in conjunction with the present invention.

In conclusion, the present invention is a high performance CRT monitor which achieves high performance without requiring undue complexity and large numbers of electrical components. In the preferred embodiments of the present invention, all of the circuitry for driving the entire CRT display monitor fits a single printed circuit board. This permits an extremely compact, lightweight, and reliable unit.

Although the present invention has been described with reference to preferred embodiments, workers skilled in the art will recognize that changes may be made in form and detail without departing from the spirit and scope of the invention.

I claim:

1. A cathode ray tube display control circuit for supplying a video control signal to a video control grid of a cathode ray tube, a blanking control signal to a blanking grid of the cathode ray tube, a vertical deflection signal to a vertical yoke, and a horizontal deflection signal to a horizontal yoke, the circuit comprising:
  a first input terminal for receiving a vertical sync signal;
  a second input terminal for receiving a horizontal blank signal;
  a third input terminal for receiving a video signal;
  vertical deflection means connected to the first input terminal for providing the vertical deflection signal and a vertical blank signal as a function of the vertical sync signal;
  a phase lock loop comprising voltage controlled oscillator means having a VCO input terminal and a VCO output terminal for providing a VCO output signal at the output terminal having a frequency which is a function of a VCO input signal at the VCO input terminal, and phase comparator means having first and second phase comparator input terminals and a phase comparison output terminal, the phase comparator means providing a phase comparator output signal which is a function of a phase comparison between signals at the first and second phase comparator input terminals;

means for providing the horizontal blank signal to the first phase comparator input terminal;

means for providing a VCO input signal at the VCO input terminal which is a function of the phase comparator output signal;

first transformer means having a primary winding and a secondary winding;

first capacitance means connected in series with the primary winding;

second capacitance means connected in series with the horizontal yoke, the second capacitance means and the horizontal yoke being connected in parallel with the first capacitance means;

first semiconductor means having a control electrode and first and second main current carrying electrodes, the first and second main current carrying electrodes being connected in parallel with the first capacitance means, and wherein the horizontal yoke is connected to the first main current carrying electrode for receiving the horizontal deflection signal;

means for providing a drive signal to the control electrode of the first semiconductor means which is a function of the VCO output signal;

means for providing a horizontal retrace signal derived from a circuit including the primary winding and the first and second main current carrying electrodes to the second phase comparator input terminal;

summing means for summing the vertical blank signal with a signal derived from the secondary winding of the first transformer means to produce a summed signal;

means for providing the blanking control signal to the blanking control grid of the cathode ray tube as a function of the summed signal; and means connected to the third input terminal for providing the video control signal as a function of the video signal supplied to the third input terminal.

2. The invention of claim 1 wherein the means for providing a drive signal comprises:

second transformer means having a primary winding and a secondary winding;

third capacitance means connected in series with the primary winding of the second transformer means;

second semiconductor means having a control electrode connected to the VCO output terminal and having first and second main current carrying electrodes connected in parallel with the third capacitance means; and wherein the secondary winding of the second transformer means has a terminal connected to the control electrode of the first semiconductor means.

3. The invention of claim 2 wherein the second semiconductor means is a voltage-controllable resistance.

4. The invention of claim 3 wherein the second semiconductor means is a VMOS transistor.

5. The invention of claim 2 wherein the primary winding of the second transformer means has a greater number of turns than the secondary winding of the second transformer means.

6. The invention of claim 2 and further comprising:

current limiting means connected between a first terminal of the primary winding of the second transformer means and a source of DC voltage; and wherein a second terminal of the primary winding of the second transformer means is connected to the first main current carrying electrode of the second semiconductor means.

7. The invention of claim 6 and further comprising:

resistance means connected in series with the third capacitance means; the resistance means and the third capacitance means being connected in series with the first and second main current carrying electrodes of the second semiconductor means.

8. The invention of claim 1 wherein the first semiconductor means comprises a monolithic Darlington amplifier having a base electrode as the control electrode, a collector electrode as the first main current carrying electrode, and an emitter electrode as the second current carrying electrode.

9. The invention of claim 6 and further comprising:

current limiting means connected between a source of DC voltage and a first terminal of the primary winding of the first transformer means; and wherein a second terminal of the primary winding of the first transformer means is connected to the collector of the monolithic Darlington amplifier.

10. The invention of claim 9 wherein the means for providing the horizontal retrace signal to the second phase comparator input terminal comprise means for limiting peak voltage of the horizontal deflection signal.

11. The invention of claim 1 wherein the means for providing the blanking signal comprise:

third semiconductor means having a control electrode for receiving the summed signal and having first and second main current carrying electrodes; and means for deriving the blanking signal from the first main current carrying electrode of the third semiconductor means.

12. The invention of claim 11 wherein the primary winding of the first transformer means has a greater number of turns than the secondary winding of the first transformer means.

13. The invention of claim 1 and further comprising:

voltage multiplier means connected to the first main current carrying electrode of the first semiconductor means for producing a multiplied DC voltage derived from the horizontal deflection signal;

an intensity control potentiometer connected to the voltage multiplier means for providing an intensity control signal to an intensity control grid of the cathode ray tube; and a focus control potentiometer connected to the voltage multiplier means for providing a focus control signal to a focus control grid of the cathode ray tube.

14. The invention of claim 1 wherein the means for providing the video control signal comprise:

fourth semiconductor means having a control electrode and first and second current carrying electrodes;

means connected to the third input terminal and the control electrode of the fourth semiconductor means for providing a control signal to the control electrode as a function of the video signal at the third input terminal;

means connected in a series current path with the first and second main current carrying electrodes of the fourth semiconductor means; and wherein the video control signal is derived from the series current path.

15. The invention of claim 1 wherein the means connected to the third input terminal comprises:
fourth semiconductor means having a control electrode connected to receive the video signal, a first main current carrying electrode connected to the video control grid, and a second main current carrying electrode connected to ground;
voltage regulator means for providing a regulated DC voltage at an output terminal; and
impedance means connected between the output terminal of the voltage regulator means and the first main current carrying electrode of the fourth semiconductor means.

16. The invention of claim 15 and further comprising:
adjustment potentiometer means connected to the voltage regulator means for adjusting the regulated DC voltage, and thereby video contrast of the cathode ray tube display.

17. A horizontal deflection circuit for providing a horizontal deflection signal to a horizontal yoke of a cathode ray tube, the circuit comprising:
a phase locked loop comprising voltage controlled oscillator (VCO) means having a VCO input terminal and a VCO output terminal for providing a VCO output signal at the output terminal which is a function of an input signal at the VCO input terminal, and phase comparator means having first and second phase comparator input terminals and a phase comparator output terminal, the phase comparator means providing a phase comparator output signal which is a function of a phase comparison between signals at the first and second phase comparator input terminals;
means for providing a horizontal blank signal to the first phase comparator input terminal;
means for providing a signal at the VCO input terminal which is a function of the phase comparator output signal;
first semiconductor means having a control electrode and first and second main current carrying electrodes;
first capacitance means connected in parallel with first and second current carrying electrodes of the first semiconductor means;
second capacitance means connected in series with the horizontal yoke, the second capacitance means and the horizontal yoke being connected in parallel with the first and second current carrying electrodes of the first semiconductor means;
impedance means connected in a series current path with the first and second current carrying electrodes of the first semiconductor means;
means for providing a feedback signal to the second phase comparator input terminal which is a function of a signal at the first main current carrying electrode of the first semiconductor means;
transformer means having a primary winding and a secondary winding;
third capacitance means connected in series with the primary winding of the second transformer means;
second semiconductor means having a control electrode connected to the VCO output terminal and having first and second main current carrying electrodes connected in parallel with the third capacitance means; and
wherein the secondary winding has a terminal connected to the control electrode of the first semiconductor means.

18. The invention of claim 17 wherein the second semiconductor means is a voltage-controllable resistance.

19. The invention of claim 18 wherein the second semiconductor means is a VMOS transistor.

20. The invention of claim 17 wherein the primary winding of the transformer means has a greater number of turns than the secondary winding.

21. The invention of claim 17 wherein the first semiconductor means comprises a monolithic Darlington amplifier having a base electrode as the control electrode, a collector electrode as the first main current carrying electrode, and an emitter electrode as the second current carrying electrode.

22. The invention of claim 17 and further comprising:
current limiting means connected between a first terminal of the primary winding of the transformer means and a source of DC voltage; and
wherein a second terminal of the primary winding of the second transformer means is connected to the first main current carrying electrode of the second semiconductor means.

23. The invention of claim 22 and further comprising:
resistance means connected in series with the third capacitance means, the resistance means and the third capacitance means being connected in parallel with the first and second main current carrying electrodes of the second semiconductor means.

24. The invention of claim 17 and wherein the impedance means comprises:
current limiting means; and
horizontal blanking signal transformer means having a primary winding and a secondary winding, the primary winding being connected in series with the current limiting means between a source of DC voltage and the first current carrying electrode of the first semiconductor means, and wherein the secondary winding of the horizontal blanking signal transformer means supplies a horizontal blanking signal for use in controlling blanking in the cathode ray tube.

* * * * *